United States Patent
Chao et al.

(10) Patent No.: US 8,995,388 B2
(45) Date of Patent: Mar. 31, 2015

(54) SYSTEMS AND METHODS FOR UPLINK RESOURCE ALLOCATION

(71) Applicant: FutureWei Technologies, Inc., Plano, TX (US)

(72) Inventors: Zhijun Chao, Ottawa (CA); Gamini Senarath, Ottawa (CA); Liqing Zhang, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 71 days.

(21) Appl. No.: 13/744,660

(22) Filed: Jan. 18, 2013

(65) Prior Publication Data

US 2013/0188576 A1    Jul. 25, 2013

Related U.S. Application Data

(60) Provisional application No. 61/588,484, filed on Jan. 19, 2012.

(51) Int. Cl.
*H04W 4/00* (2009.01)
*H04W 72/04* (2009.01)
(Continued)

(52) U.S. Cl.
CPC .............. *H04W 72/04* (2013.01); *H04L 47/00* (2013.01); *H04L 1/0003* (2013.01); *H04L 1/0009* (2013.01); *H04L 1/0026* (2013.01); *H04W 72/1226* (2013.01); *H04W 72/1247* (2013.01)
USPC .......................................... 370/330; 370/341

(58) Field of Classification Search
CPC ......... H04W 72/04; H04W 4/00; H04L 47/00
USPC .......................................... 370/329, 330, 341
See application file for complete search history.

(56) References Cited

U.S. PATENT DOCUMENTS 6,351,461 B1    2/2002    Sakoda et al.
6,788,687 B2    9/2004    Bao et al.
(Continued)

FOREIGN PATENT DOCUMENTS

CN    1545217    11/2004
CN    101272172    9/2008
(Continued)

OTHER PUBLICATIONS

Kim, Dong-Cheol et al., "Proposed Modification on Power Control Section (AWD-15.3.9.4)," IEEE 802.16 Broadband Wireless Access Working Group, http://ieee802.org/16>, IEEE C802.16m-09/1524r1, Jul. 2009, 6 pages.
(Continued)

*Primary Examiner* — Sai-Ming Chan
(74) *Attorney, Agent, or Firm* — Slater & Matsil, L.L.P.

(57) ABSTRACT

A method embodiment for transmission scheduling includes implementing, by a first base station (BS), a soft-persistent scheduling scheme. The soft-persistent scheduling scheme includes allocating a first resource block to a first UE and other resource blocks to other UEs for a first transmission time interval (TTI), calculating a first priority of the first UE for the first resource block for a second TTI, wherein calculating the first priority involves including a first bonus in the first priority, and wherein the second TTI is later than the first TTI, calculating other priorities for the other UEs and the other resource blocks for the second TTI, and allocating the first and the other resource blocks to the first and other UEs for the second TTI in accordance with the first priority of the first UE as modified by the first bonus and the other priorities of the other UEs.

20 Claims, 2 Drawing Sheets

(51) Int. Cl.
  *H04L 12/70* (2013.01)
  *H04L 1/00* (2006.01)
  *H04W 72/12* (2009.01)

(56) References Cited

U.S. PATENT DOCUMENTS

| | | |
|---|---|---|
| 6,993,063 B2 | 1/2006 | Zeira et al. |
| 7,103,350 B2 | 9/2006 | Au et al. |
| 7,120,189 B2 | 10/2006 | Zeira et al. |
| 7,412,254 B2 | 8/2008 | Senarath et al. |
| 7,733,977 B2 | 6/2010 | Kuri et al. |
| 7,917,164 B2 | 3/2011 | Rao |
| 7,940,725 B2 | 5/2011 | Jeong |
| 8,116,805 B2 | 2/2012 | Das et al. |
| 8,160,602 B2 | 4/2012 | Wu et al. |
| 8,179,853 B2 | 5/2012 | Hu et al. |
| 8,238,958 B2 | 8/2012 | Bourlas et al. |
| 8,254,312 B2 | 8/2012 | Cheng et al. |
| 8,311,055 B2 | 11/2012 | Senarath et al. |
| 8,320,928 B2 | 11/2012 | Wu et al. |
| 8,331,342 B2 | 12/2012 | Khan et al. |
| 8,340,593 B2 | 12/2012 | Yang et al. |
| 8,346,290 B2 | 1/2013 | Koc et al. |
| 8,422,956 B2 | 4/2013 | Narasimha et al. |
| 2006/0094363 A1 | 5/2006 | Kang et al. |
| 2006/0094372 A1 | 5/2006 | Ahn et al. |
| 2006/0209767 A1 | 9/2006 | Chae et al. |
| 2007/0189234 A1 | 8/2007 | Heo et al. |
| 2008/0232332 A1 | 9/2008 | Kaminski et al. |
| 2008/0280638 A1 | 11/2008 | Malladi et al. |
| 2009/0125363 A1 | 5/2009 | Frederiksen et al. |
| 2010/0027688 A1 | 2/2010 | Suh et al. |
| 2010/0128687 A1 | 5/2010 | Oteri et al. |
| 2010/0173638 A1 | 7/2010 | Aiba et al. |
| 2010/0304776 A1 | 12/2010 | Wu et al. |
| 2011/0039589 A1 | 2/2011 | Skov |
| 2011/0103287 A1 | 5/2011 | Ma et al. |
| 2011/0136533 A1 | 6/2011 | Senarath et al. |
| 2011/0177821 A1 | 7/2011 | Senarath et al. |

FOREIGN PATENT DOCUMENTS

| | | |
|---|---|---|
| CN | 101272388 | 9/2008 |
| CN | 101305538 | 11/2008 |
| CN | 101370240 | 2/2009 |
| CN | 101378299 | 3/2009 |
| CN | 101399572 | 4/2009 |
| CN | 101626260 | 1/2010 |
| EP | 1811686 | 7/2007 |
| EP | 2056614 | 5/2009 |
| EP | 2510729 | 10/2012 |
| JP | 2008072722 | 3/2008 |
| WO | WO2008/073013 | 6/2008 |
| WO | WO2008/076940 | 6/2008 |
| WO | WO2009/100567 | 8/2009 |
| WO | WO2009138841 | 11/2009 |

OTHER PUBLICATIONS

European Search Report, Huawei Technologies Co., Ltd., PCT/CN2010/079547, Dec. 2012, 10 pages.
European Search Report, Huawei Technologies Co, Ltd., PCT/CN2011/070409, Jun. 2012, 9 pages.
International Search Report and Written Opinion, Huawei Technologies, PCT/CN2010/079496, mail date Mar. 17, 2011, 11 pages.
International Search Report and Written Opinion, Huawei Technologies, PCT/CN2010/079547, mail date Mar. 17, 2011, 16 pages.
International Search Report and Written Opinion, Huawei Technologies Co., Ltd., PCT/CN2011/070409, mail date Apr. 21, 2011, 10 pages.
International Search Report and Written Opinion, Huawei Technologies Co., Ltd., PCT/CN2011/070890, mail date May 19, 2011, 9 pages.
International Search Report and Written Opinion, Huawei Technologies Co., Ltd., PCT/US13/22143, mail date Mar. 29, 2013, 8 pages.
Dahlman, Erik et al., "Key features of the LTE radio interface," Ericsson Review, No. 2, 2008, 4 pages.
Myung, Hyung G. et al., "Single Carrier FDMA for Uplink Wireless Transmission," IEEE Vehicular Technology Magazine, Sep. 2006, 9 pages.
Jalali, A. et al., "Data Throughput of CDMA-HDR a High Efficiency-High Data Rate Personal Communication Wireless System," IEEE, 2000, 5 pages.
Mueller, Andreas et al., "Cooperative Interference Prediction for Enhanced Link Adaption in the 3GPP LTE Uplink," IEEE 2010, 6 pages.
Knopp, R. et al., "Information Capacity and Power Control in Single-Cell Multiuser Communications," Mobile Communications Group, Institut Eurécom, Stanford University, IEEE, 1995, 5 pages.
Xiao, Weimin et al., "Uplink Power Control, Interference Coordination and Resource Allocation for 3GPP E-UTRA," IEEE 2006, 5 pages.
Yates, Roy D. et al., "Integrated Power Control and Base Station Assignment," IEEE Transactions on Vehicular Technology, vol. 44, No. 3, Aug. 1995, 7 pages.
Yates, Roy D. "A Framework for Uplink Power Control in Cellular Radio Systems," IEEE Journal on Selected Areas in Communications, vol. 13, No. 7, Sep. 1995, 7 pages.
Zander, Jens, "Performance of Optimum Transmitter Power Control in Cellular Radio Systems," IEEE Transactions on Vehicular Technology, vol. 41, No. 1, Feb. 1992, 6 pages.
Senarah, G. et al., "Power Control and ICIC for Uplink in LTE," Huawei Technologies, Co., Ltd., Aug. 14, 2009, 8 pages.
Foschini, Gerard J. et al., "A Simple Distributed Autonomous Power Control Algorithm and its Convergence," IEEE Transactions on Vehicular Technology, vol. 42, No. 4, Nov. 1993, 6 pages.
Gjendemsjø, Anders et al., "Binary Power Control for Sum Rate Maximization over Multiple Interfering Links," IEEE Transactions on Wireless Communications, vol. 7, No. 8, Aug. 2008, 10 pages.
Halpern, S. W., "Reuse Partitioning in Cellular Systems," Proceedings of 33rd IEEE Vehicular Technology Conference, vol. 33, May 1983, pp. 322-327.
Hande, P. et al., "Distributed Uplink Power Control for Optimal SIR Assignment in Cellular Data Networks," IEEE Communications Society, Proceedings IEEE Infocom, 2006, 13 pages.
"Evolved Universal Terrestrial Radio Access (E-UTRA); Medium Access Control (MAC) protocol specification," Technical Specification 136.321, 3rd Generation Partnership Project, v8.4.0., Jan. 2009, pp. 1-44.
"LTE; Evolved Universal Terrestrial Radio Access (E-UTRA); Physical layer procedures," Technical Specification 136.213, 3rd Generation Partnership Project; v8.5.0., Feb. 2009, pp. 1-75.
3rd Generation Partnership Project, Technical Specification Group Radio Access Network; Evolved Universal Terrestrial Radio Access (E-UTRA); Physical layer procedures, 3GPP TS 36.213 v8.6.0., Mar. 2009, 77 pages.
3rd Generation Partnership Project, Technocal Specification Group Radio Access Network; Evolved Universal Radio Access (E-UTRA); Physical layer procedures, Release 8, 3GPP TS 36.213 v8.8.0, Sep. 2009, 77 pages.
"LTE; Evolved Universal Terrestrial Radio Access (E-UTRA); Physical layer procedures (3GPP TS 36.213 version 8.8.0 Release 8)", ETSI TS 136 213 v8.8.0., Oct. 2009, 79 pages.
CHTTL, "Further Simulation Results of User Grouping Methods for Downlink Inter-cell interference coordination," R1-083104, 3GPP TSG-RAN WG1 #54, Jeju, Korea, Aug. 18-22, 2008, 6 pages.

SYSTEMS AND METHODS FOR UPLINK RESOURCE ALLOCATION

This application claims the benefit of U.S. Provisional Application No. 61/588,484, filed on Jan. 19, 2012, entitled "Systems and Methods for Uplink Resource Allocation," which application is hereby incorporated herein by reference.

TECHNICAL FIELD

The present invention relates to systems and methods for wireless communications, and, in particular embodiments, to systems and methods for uplink resource allocation.

BACKGROUND

A 3GPP Long Term Evolution (LTE) wireless network may use uplink frequency selective scheduling to take advantage of frequency selective gain. Conventionally, the uplink scheduler in a base station (BS) varies the assignment of resource blocks (RBs) for user equipment (UEs) in each transmission time interval (TTI) to achieve gains through frequency selection (known as frequency selective gain or frequency selective scheduling (FSS) gain). This gain is achieved by allocating a UE to RBs within a small subband of frequencies having the most favorable conditions for that UE among the entire frequency band. The scheduler may allocate UEs to the RBs having the best quality for each UE at a particular TTI. However, this approach to scheduling generally leads to interference variation perceived in a neighboring BS (i.e., the interference perceived at a neighboring BS varies and may be unpredictable). This interference variation generally makes modulation and coding scheme (MCS) adaptation or link adaptation difficult to perform, thus degrading uplink performance. Interference variation causes performance degradation of MCS adaptation, and thus impacts the overall uplink performance.

SUMMARY

These and other problems are generally solved or circumvented, and technical advantages are generally achieved, by preferred embodiments of the present invention which are systems and methods for uplink resource allocation.

In accordance with an embodiment of the present invention, a method for resource allocation includes implementing, by a first base station (BS), a soft-persistent scheduling scheme. The soft-persistent scheduling scheme includes allocating, by the first BS, a first resource block to a first UE and other resource blocks to other UEs for a first transmission time interval (TTI), calculating, by the first BS, a first priority of the first UE for the first resource block for a second TTI, wherein calculating the first priority involves including a first bonus in the first priority, and wherein the second TTI is later than the first TTI, calculating, by the first BS, other priorities for the other UEs and the other resource blocks for the second TTI, and allocating, by the first BS, the first and the other resource blocks to the first and other UEs for the second TTI in accordance with the first priority of the first UE as modified by the first bonus and the other priorities of the other UEs.

In accordance with another embodiment of the present invention a base station (BS) includes a processor, and a computer readable storage medium storing programming for execution by the processor, the programming including instructions to calculate first priorities of a first user equipment (UE) for various resource blocks for a current transmission time interval (TTI), wherein the calculation of the first priorities includes instructions to determine a first set of recent resource blocks, wherein the first set of recent resource blocks correspond to resource blocks allocated to the first UE in a recent past period of TTIs and include a first set of bonuses in the calculation of the first priorities of the first UE for the first set of recent resource blocks, calculate other priorities of other UEs for various resource blocks for the current TTI, and allocate various resource blocks to the first and other UEs for the current TTI in accordance with a calculated priorities of the first and the other UEs.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
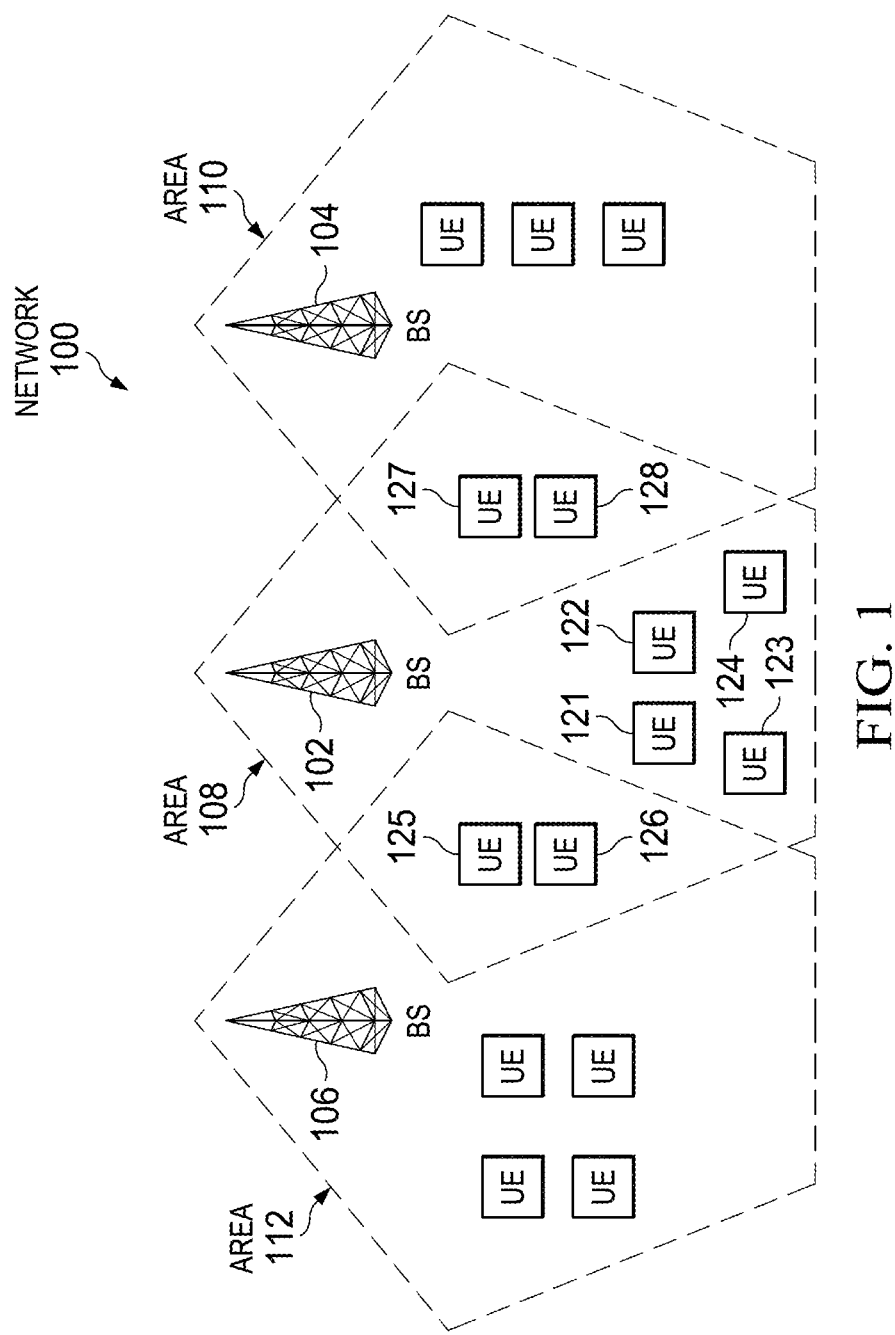
FIG. 1 is a block diagram illustrating a network that may be used for implementing, for example the devices and methods described herein, in accordance with an embodiment.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A typical base station (BS)'s uplink scheduler may vary the user equipment (UE) assigned to particular resource blocks in order to take advantage of frequency selective gain. However, this approach to uplink scheduling causes variation in the interference perceived at neighboring BSs. The interference variation may cause the degradation of modulation and coding scheme (MCS) adaptation, which degrades overall uplink performance. However, if resources are persistently allocated to a UE, the UE may only use the averaged uplink channel quality indicator (CQI) to perform MCS selection and loses the availability of frequency selective gain.

Currently, a type of persistence scheduling may be used to achieve some frequency selective gain while improving MSC adaptation conditions. The persistence scheduling methods currently used involve categorizing resource blocks (RBs) into different types so that the BS may schedule a longer or shorter repetition of a RB for a UE based on the RB's type. An issue with this approach is it may overly restrict the allocation of resources and limit the achievable frequency selective gain. Furthermore, the persistence scheduling process is complex, and the hybrid automatic repeat request (HARQ) mechanism needs to be planned carefully. This kind of persistent scheduling is designed to smooth the interference. Uplink synchronized non-adaptive hybrid HARQ retransmissions may interrupt the persistent resource allocation of some other UEs, which leads to an abrupt change of interference. In order to overcome this, the persistent resource allocation has to be carefully planned, such that the HARQ retransmissions are consistent with the persistent resource allocations. Due to these addition restrictions on the resource allocation, even more flexibility and frequency selective gain may be lost. Accordingly, a system and method for uplink resource allocation is provided to address these concerns.

Various embodiments will be described with respect to preferred embodiments in a specific context, namely an uplink resource allocation algorithm for a LTE wireless network. The invention may also be applied, however, to other algorithms and networks. For example, various embodiments can be applied to radio resource management (RRM) algorithms, scheduling algorithms, MCS adaptation algorithms, and power control algorithms on LTE radio access networks (RANs) and LTE eNode-B networks. Further, various embodiments are not restricted to LTE networks and may also apply to other orthogonal frequency-division multiplexing (OFDM) based networks, such as worldwide interoperability for microwave access (WiMAX) band adaptive modulation and coding (AMC) mode networks and the like.

FIG. 1 illustrates a block diagram of a wireless network according to an embodiment. Network 100 includes several base stations (BS) 102, 104, and 106 each servicing a geographic area 108, 110, and 112 respectively. As shown in FIG. 1, BSs 104 and 106 neighbor BS 102. Network 100 may be a 3GPP Long Term Evolution (LTE) wireless network, and BSs 102, 104, and 106 may be enhanced NodeBs (eNodeBs). In other embodiments, network 100 may comprise any number of BSs configured in different geographic layouts, wherein multiple BSs may neighbor each other and/or a particular BS.

The BSs transmit/receive data and allocate (schedule) system resources for individual user equipment (UE) within its area. For example, BS 102 transmits/receives data and allocates resources to UEs 121-128. The operation of UEs within a particular BS may cause interference at neighboring BSs. In particular, UEs at the geographical perimeters of a BS, known as cell edge users (CEU), may cause substantial interference for neighboring BSs compared to UEs located in the center of a BS's geographic coverage area, known as cell center users (CCU). This increase in interference caused by CEUs may be attributed to the CEUs being in closer proximity to or crossing over into a neighboring BS's coverage area (coverage areas may overlap). In FIG. 1, UEs 125 and 126 may cause greater interference for BS 106 than the other UEs covered by BS 102; similarly, UEs 127 and 128 may cause greater interference for BS 104 than the other UEs covered by BS 102. Further, these CEUs may require more power to receive/transmit data from/to its assigned BS compared to CCUs.

Each BS operates within a certain transmission bandwidth to uplink and downlink. The transmission bandwidth is subdivided into individual resource blocks (RB). Each RB is the minimum allocation unit for system resource allocation and may occupy about 180 kHz of bandwidth in an LTE network. The BSs schedule the UEs to the RBs in its area for each transmission time interval (TTI) based on a non-persistent utility scheduling algorithm as is known in the art. For example, a proportionally fair, exponential proportionally fair, or modified-longest weighted queue first (M-LWQF) scheduler may be used.

RBs occupying the edges of the transmission bandwidth may be referred to as cell edge bandwidth (CEB), while RBs occupying the center of the transmission bandwidth may be referred to as cell center bandwidth (CCB). Typical scheduling schemes, such as an inter-cell interference coordination (ICIC) scheme, may restrict CEUs to be scheduled on CEBs. Further, the scheduler may coordinate the CEBs and CCBs among different BSs in a network, such that CEB of the serving BS does not collide (i.e., does not overlap) with CEB of its neighbor BSs. Therefore, the UEs on CEBs may experience less interference from neighbor BSs than if the UEs were scheduled on CCBs.

The non-persistent nature of a typical RB scheduling algorithm (i.e., a UE may be scheduled to different RBs at different TTIs) can cause great variation in the interference perceived at a neighboring UE. For example, the scheduling of UEs 125 and 126 to different RBs at different TTIs may cause the interference perceived at BS 106 to vary dramatically over time and be unpredictable. This variance poses difficulties for modulation and coding scheme (MCS) adaptation for UEs covered by BS 106. An embodiment implements a RB scheduling algorithm that provides a tradeoff between improving MCS adaptation and maximizing frequency selective gain. The scheduling algorithm may implement a soft-persistent method of smoothing interference variation perceived at a BS.

An embodiment reduces the interference volatility and smoothes the interference perceived by each BS 102, 104, and 106 such that the MCS adaptation is improved while keeping reasonable frequency selective gains. An embodiment diminishes the variation of the interference by optimizing uplink (UL) resource allocation in each BS by enhancing the performance of each BS by using a scheduling technique to maximize both frequency selective gain and MCS adaptation performance.

The uplink resource allocation method in a BS (e.g., BS 102) controls the variation of the interference in a smooth way, which makes it possible to balance frequency selective gain and MCS adaptation performance. At a given TTI, where a UE (e.g., UE 126) was allocated to certain RBs in previous TTIs, a bonus is added to that UE's priority on these previously allocated RBs. Based on the priority and bonus, the BS's scheduler allocates resources in the current TTI. This soft-persistent scheduling allows for UEs to be more persistently scheduled to the same RBs, decreasing the interference variation perceived at a neighboring BS (e.g., for UE 126 scheduled more persistently on BS 102, interference variation at BS 106 would decrease). The greater the bonus, the more likely a UE will be persistently scheduled. Because all BSs 102, 104, and 106 may implement this soft-persistent scheduling, the BSs may work in tandem to smooth interference variation across the entirety of network 100. However, unlike hard-persistent scheduling methods, if a different RB in a BS's transmission bandwidth has sufficiently better quality for a UE, the scheduler may still allocate the UE to the better quality RB and achieve frequency selective gain. By implementing an appropriate bonus, network 100 may balance MSC adaptation with frequency selective gain.

Figure 2:
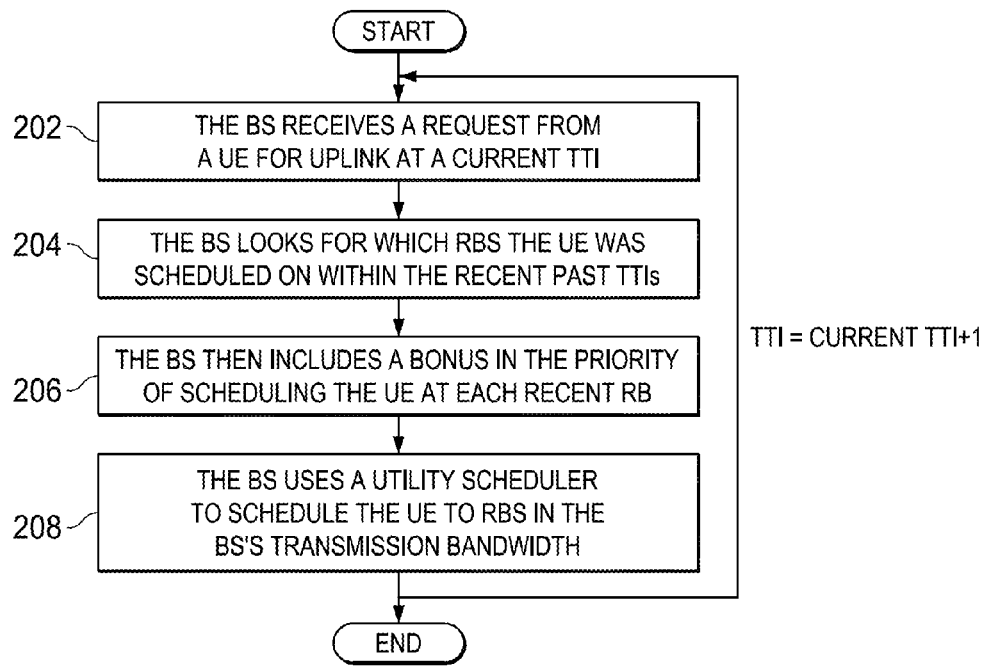
FIG. 2 is a flow diagram of an uplink resource allocation method according to an embodiment.

FIG. 2 illustrates a flow diagram for uplink scheduling according to an embodiment, which may be implemented by a BS (e.g., BS 102) in FIG. 1. In step 202, the BS receives a request from a UE in its coverage area (e.g., UE 126) for uplink at a current TTI (TTI(0)). UE 126 may be scheduled persistently from one TTI to the next, and a BS may schedule multiple or all UEs (UEs 120-128) in its coverage area simultaneously.

In step 204, the BS looks for which RBs the UE was scheduled on within the recent past TTIs. BS 102 may look at UE 126's RB allocation for the past X number of TTIs (TTI(−1), TTI(−2), TTI(−3), . . . TTI(−X)). BS 102 determines which RBs UE 126 was recently scheduled on (hereinafter recent RBs). In various embodiments, the range of X is between one and ten TTIs although other ranges for X may also be used.

In step 206, the BS then includes a bonus in the priority of scheduling the UE at each recent RB. For example, UE 126 may have been scheduled for a particular RB (RB(3)) at TTI(−1). Accordingly, a bonus would be included in the priority for scheduling UE 126 at RB(3). By including a bonus in the priority of UE 126 at a particular RB, UE 126 is more likely to be persistently scheduled to the same RBs. This persistent allocation smoothes the interference variation perceived at neighboring BS 106 caused by UE 126, which smoothes the overall interference variation at BS 106.

In step 208, the BS uses a utility scheduler to schedule the UE to RBs in the BS's transmission bandwidth. An embodiment controls the variation of the interference in each BS, enhances the quality of service (QoS) of UEs, and maximizes the overall network performance by taking advantage of both frequency selective gain and MCS adaptation. In an embodiment, for each UE that is allocated in the previous TTI, a bonus is added to its priority on the corresponding RBs that were allocated to this UE in the previous X TTIs. Based on the priority, the scheduler allocates RBs in the current TTI. An embodiment may comprise interference variation information exchange between the BSs on the uplink bandwidth. The bonus implementation for a BS may be adjusted according to interference variation levels perceived by its neighbor BSs.

The entire process is then repeated for the next TTI, TTI(1). For TTI(1), the BS would look for the UE's recent RBs in the time frame of TTI(0), TTI(−1), . . . (TTI(−X+1)). A bonus included in the priority of the UE for these updated recent RBs, and the UEs would be scheduled to RBs accordingly.

The bonus may be included in a UE's priority in various ways. For example, the bonus may be included as an offset added to the overall priority function for UE 126; as a coefficient multiplied to the overall priority function for UE 126; as an offset added to a parameter used to calculate the over priority function for UE 126, or as a coefficient multiplied to the parameter used to calculate the overall priority function for UE 126. The parameter used to calculate the overall priority function may be, for example, a signal to interference plus noise ratio (SINR) in either the frequency or time domain of UE 126, a MCS level of UE 126, or an overall data rate of UE 126, or a combination of these parameters. The SINR of UE 126 may be used to calculate the MCS level of UE 126 or the data rate of UE 126.

For example, the bonus may be included in a UE's priority by adjusting the existing priority formula and adding an offset to the SINR as follows:

$$P_i = P_{0i} \frac{rate_i(SINR + \text{offset})}{rate_i(SINR)}$$

wherein $P_i$ is the new priority for the UE at TTI(i) accounting for the bonus and $P_{0i}$ is an existing priority that would have been assigned to the UE at TTI(i) without the bonus as is known in the art. Offset is an implementation of the bonus and may be a constant value or an equation based on certain parameters (e.g., observed interference variation). An example formula for $P_{0i}$ in a proportionally fair scheduling scheme may be:

$$P_{0i} = \frac{rate_i(SINR)}{rate_{avg}(SINR)}$$

wherein $rate_i(SINR)$ is the instance throughput for the UE at TTI(i) (i.e., throughput the UE would have if it were allocated to the RB at TTI(i)), and $rate_{avg}(SINR)$ is the average throughput already achieved by the UE in a recent timeframe (e.g., the past two seconds). An example formula for rate (SINR) may be rate(SINR)=$\log_{10}$(1+SINR). The formulas given in this paragraph are for illustrative purposes only to explain the principle behind various embodiments. Alternate embodiments may use varying formulas for priority, throughput, etc. For example, $P_i$ and $P_{0i}$ may be based on $eff_i$(SINR) in addition to or instead of $rate_i$(SINR), wherein $eff_i$(SINR) is the spectrum efficiency corresponding to the SINR.

The offset or coefficient used to implement the bonus may either be a constant or variable, and it may be calculated according to certain parameters. Selection of the bonus implements a tradeoff between smoothing the interference variation and maximizing frequency selective gain. The parameters used to select an appropriate bonus may be BS specific, UE specific, transmission bandwidth specific, or sub-band specific to control the possibility of a UE being scheduled on the same RBs. Further, the parameters may account for different RB and/or UE types. For example, the parameters may select different bonuses for CEU on CCB, CEU on CEB, CCU on CCB, or CCU on CEB on the same BS. These differing bonuses may control the interference variations on CCB and CEB to meet different performance targets.

In an embodiment, the bonus may be implemented at each BS with no interference variation information exchange between the BSs. In an alternate embodiment interference variation statistics may be exchanged between the BSs and used to implement the bonus. This information may be specific to each RB or be aggregate data for a group of RBs. The overhead used for this information exchange may be limited to a small amount.

In an embodiment, the bonus may be added independently at each BS, with no interference variation information exchange between the BSs. For example, the bonus may be an offset added to the SINR of UE 126's priority at a recent RB. Alternatively, the bonus may be adjusted based on a function. For example, the bonus may be a function of the number of times a particular recent RB was scheduled for the UE within the relevant timeframe.

In an alternate embodiment, the variation in the difference of the interference between two adjacent TTIs (e.g., TTI i and TTI i−1) on the same bandwidth is calculated for each BS. This interference variation information may be exchanged between BSs for any resolution of uplink bandwidth (e.g., for each RB, for a resource block group (RBG), for the entire transmission bandwidth etc.). The bonus at each BS is then adjusted according to the interference variation information received from neighboring BSs. The bonus may be adjusted in various ways. For example, the bonus may be calculated according to a predetermined equation accounting for the long-term statistics of interference perceived at neighboring BSs and the UE's location. Alternatively, the bonus may be adjusted according to the current interference variation information from the neighbor BSs, wherein the information is updated periodically using for example, X−2 signaling or a central control entity.

An embodiment of adjusting the bonus using information exchange is given below. Each BS k calculates the interference power I(r,t) on each RB r in the BS's transmission bandwidth in TTI t. Each BS k calculates the variation in the interference perceived in TTI t compared to the previous TTI t−1 ($\Delta I_k(r,t)=I_k(r,t)-I_k(r,t-1)$) and the standard deviation of the interference variation perceived over time for BS k ($\sigma_{\Delta I}^k(r)=\sigma(\Delta I_k(r,t))$) as follows:

$$E(\Delta I_k(r),t)=(1-\alpha)\times E(\Delta I_k(r),t-1)+\alpha\times\Delta I_k(r,t)$$

$$E(\Delta I_k^2(r),t)=(1-\alpha)\times E(\Delta I_k^2(r),t-1)+\alpha\times\Delta I_k^2(r,t)$$

$$\sigma_{\Delta I}^k(r) = \sigma(\Delta I_k(r), t) = \sqrt{E(\Delta I_k^2(r), t) - E^2(\Delta I_k(r), t)}.$$

Each BS then exchanges this information regarding the interference variation $\sigma_{\Delta I}^k(r)$ between each other using, for example, X-2 signaling. On receiving the information of the interference variation from the neighbor BS j, BS k may update a UE u's bonus by changing the offset (or coefficient, etc.) according to one of the following equations:

$$\text{offset}(u) = \max\left\{\min\left\{\text{offset}(u) + \beta\left(\max_{j \in N(u)} \sigma_{\Delta I}^j(r) - \sigma_T(r)\right), \text{OFFSET}_{MAX}\right\}, 0\right\}, \quad (E1)$$

or $$\text{offset}(u) = \max\left\{\min\left\{\text{offset}(u) + \beta\left(\frac{1}{|N(u)|}\sum_{j \in N(u)}(\sigma_{\Delta I}^j(r)) - \sigma_T(r)\right), \text{OFFSET}_{MAX}\right\}, 0\right\}. \quad (E2)$$

wherein β is a proportion coefficient related to the change in interference, $\sigma_T$ is the target interference variation caused by a RB, N(u) is a set of neighbor BSs that UE u is adjacent to (e.g., in FIG. 1 UE 126 is adjacent to BS 104), and offset(u) is the calculated bonus. The effect of the bonus may be limited within the range [0, $\text{OFFSET}_{MAX}$].

The method of updating the bonus through its offset (or coefficient) can be any other function of interference variation $\sigma_{\Delta I}^j(r)$. In various embodiments, the offset may be a function of maximum interference variation $\sigma_{\Delta I}^j(r)$ perceived a neighboring BS (illustrated by equation E1) or a function of the averaged interference variation $\sigma_{\Delta I}^j(r)$ perceived by neighboring BSs (illustrated by equation E2). In the above embodiments, the target interference variation is determined on an individual RB level (equations E1 and E2 calculates specific parameters according to RB r); however, the equations may be modified to account for other bandwidth resolutions (e.g., RB groups, CCB, or CEB, etc.).

The embodiments above allow for interference variation to be kept below a target level while allowing for some frequency selective gain. For example, in equation E1, when $\sigma_{\Delta I}^j(r) > \sigma_T(r)$ for some neighbor cell j (i.e., interference variation at neighbor cell j is greater than the target interference), offset(u) is increasing such that scheduler more persistently schedules the UE that is adjacent to cell j, which in turn produces more constant interference to cell j (i.e., $\sigma_{\Delta I}^j(r)$ will decrease). On the other hand, when $\sigma_{\Delta I}^j(r) < \sigma_T(r)$ for all the neighbor cells (i.e., interference variation at all neighbor cells less than the target interference), offset(u) decreases such that it allows the scheduler to more randomly schedule the UE, which in turn produces more frequency selective gain but causes more interference variation to neighbor cells (i.e., $\sigma_{\Delta I}^j(r)$ will increase).

In an alternate embodiment, signaling between BSs, such as X-2 signaling is used to trigger soft persistence scheduling. For example, X-2 signaling allows a BS to know what UEs neighbor BSs have scheduled. Therefore, the BS may determine which neighboring BSs are responsible for its perceived interference and interference variation. The BSs in a network, such as network 100, may schedule UEs based on known methods to maximize frequency selective gain. When interference variation at a BS, such as BS 106, is high (e.g., above a target threshold), BS 106 may determine which of its neighbor BSs is scheduling the UEs responsible for the high interference variation (e.g., BS 102). BS 106 may then signal to the responsible neighbor BS (BS 102) to implement soft persistence scheduling until the interference variation falls to an acceptable level (e.g., below the threshold). The soft persistence scheduling scheme used by the neighbor BS (BS 102) may be the same as the soft persistent schemes described above.

An embodiment may be UE specific. For example, applying the above equations E1 or E1 above for CCUs, there are no BSs that neighbor these UEs, and the bonuses for these UEs can be very small or even zero. Therefore, frequent selective scheduling may be used to maximize frequency selection gain in CCUs. In contrast, for CEUs, these UEs may cause more interference to neighboring BSs, so the bonuses of these UEs are related to the variation of the interference of the neighbors. The UE may be scheduled more persistently on the same RBs to smooth the interference variation of the neighbors. For example, in FIG. 1, UEs 121-124 are located in the center area of BS 102. UEs 121-124 may have relatively small bonuses in order maximize frequency selective gain. UEs 125 and 126 are on the boundary of BSs 102 and 104. UEs 125 and 126's bonuses may be set according to the interference variation of BS 104. Likewise, UEs 127 and 128 are on the boundary of BS 102 and BS 106, and their bonuses may be set according to the interference variation of BS 106.

The bonus may be adjusted using other parameters in addition to interference variation. For example, the ratio, $\gamma_{ik}^j$, of the received power $P_{rik}^j$ from the scheduled UE k in BS i to its neighbor BS j to the averaged interference $I_j$ of BS j, i.e., $$\gamma_{ik}^j = \frac{P_{rik}^j}{I_j}.$$

This ratio is an indication of the impact of the interference caused by UE k to BS j. The greater $\gamma_{ik}^j$, the greater the impact of scheduling UE k to the interference variation at BS j. An example adjustment of using this parameter to update the bonus is:

$$\text{offset}(u) = \max\left\{\min\left\{\text{offset}(u) + \beta\left(\sum_{j \in N(u)} \gamma_{ik}^j(\sigma_{\Delta I}^j(r) - \sigma_T(r))\right), \text{OFFSET}_{MAX}\right\}, 0\right\}. \quad (E3)$$

In equation E2, $\gamma_{ik}^j$ is used as a weight to affect the impact of the difference between the perceived inference variation and the target interference variation, $\sigma_{\Delta I}^j(r) - \sigma_T(r)$. The received power of UE k in BS i to its neighbor j can be obtained with the knowledge of the downlink received power at UE k from BS j, if reciprocity of the channel is assumed (for example in a time division duplexing (TDD) system.) If reciprocity cannot be used, the mean received power can be assessed using the downlink path loss and uplink transmit power of UE k. Instead of average interference power at cell j, the interference power at a particular RB where the UE k is scheduled can also be used for more accurate modeling of the impact.

Uplink performance may be closely related to the link adaptation. When interference variation is high, the performance of AMC worsens. Typically, interference variation is tightly related to the interference level (i.e., the higher the interference level, the more interference variation). Therefore, the uplink performance, especially the performance of the CEUs, is affected when the uplink transmission power increases. The CEUs' performances worsen not only because the increase in interference level but also because of the related increase in interference variation. Various embodiments control the variation of the interference, which helps enhance the performance of UEs, especially CEUs (i.e., the best working point of power control improves because of lower interference variation). An embodiment may tune the BS specific working point of power control to further improve system level performance.

An embodiment has a further advantage of allowing for better interference prediction for performing MCS adaption. Typically, the uplink interference is averaged so that that MCS adaptation is determined using long-term averaged interference. The use of averaged interference was necessary because there was almost no correlation between the interference perceived from one TTI to another TTI. In an embodiment using soft-persistent scheduler, interference becomes smoother (i.e., the interference from one TTI to another TTI may become more correlated). In an embodiment, the MSC adaptation can be further improved by taking into account any interference correlation. Instead of using a long-term averaging of interference, all types of filters can be used to predict the interference after, e.g., four TTIs. For example, instantaneous interference measurement instead of using long-term averaged interference may be used for SINR calculation.

Figure 3:
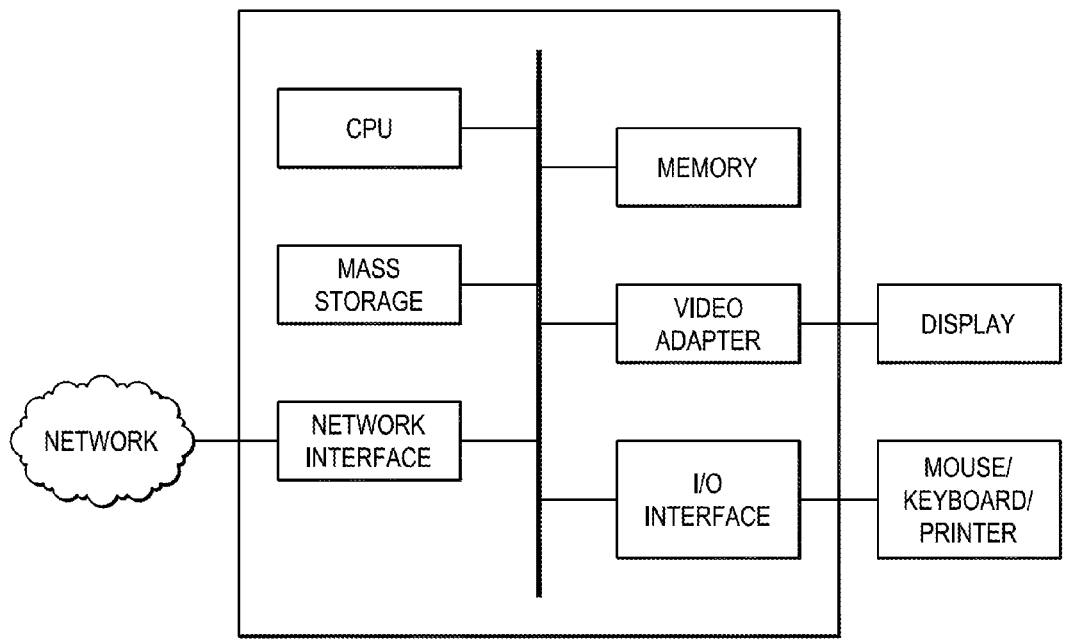
FIG. 3 is a block diagram illustrating a computing platform that may be used for implementing, for example, the devices and methods described herein, in accordance with an embodiment.

FIG. 3 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for resource allocation comprising:
  implementing, by a first base station (BS), a soft-persistent scheduling scheme, the soft-persistent scheduling scheme comprising:
    allocating, by the first BS, a first resource block to a first UE and other resource blocks to other UEs for a first transmission time interval (TTI);
    calculating, by the first BS, a first priority of the first UE for the first resource block for a second TTI, wherein calculating the first priority comprises including a first bonus in the first priority, and wherein the second TTI is later than the first TTI;
    calculating, by the first BS, other priorities for the other UEs and the other resource blocks for the second TTI; and
    allocating, by the first BS, the first and the other resource blocks to the first and other UEs for the second TTI in accordance with the first priority of the first UE as modified by the first bonus and the other priorities of the other UEs.

2. The method of claim 1, wherein calculating the other priorities further comprises including other bonuses in the other priorities of the other UEs for the other resource blocks for the second TTI, wherein the other bonuses are included in each of the other priorities of each of the other UEs for each resource block corresponding to the other resource block allocated to the other UE in the first TTI.

3. The method of claim 1, wherein the second TTI is within ten TTIs of the first TTI.

4. The method of claim 1, wherein the first bonus is a constant value.

5. The method of claim 1, further comprising calculating the first bonus in accordance with interference variation information known to the first BS.

6. The method of claim 1, wherein including the first bonus in the first priority comprises adding an offset to the first priority, multiplying a coefficient to the first priority, adding an offset to a parameter included in calculating the first priority, multiplying a coefficient to the parameter, or a combination thereof.

7. The method of claim 6, wherein the parameter is a signal to interference plus noise ratio (SINR), a modulation and coding scheme (MCS) level, a data rate of the first UE, or a combination thereof.

8. The method of claim 1, further comprising:
  receiving, by the first BS, interference variation information from a second BS, the second BS being a neighbor of the first BS; and calculating the first bonus in accordance with the received interference variation information.

9. The method of claim 1, further comprising:
  determining, by a second BS, an interference variation level at the second BS caused by the first BS;
  receiving, by the first BS, a soft-persistent scheduling signal from the second BS when the interference variation level at the second BS caused by the first BS is higher than an interference variation threshold; and
  triggering the implementing of the soft-persistent scheduling scheme in accordance with the soft-persistent scheduling signal received at the first BS.

10. The method of claim 9, wherein determining, by a second BS, an interference variation level at the second BS caused by the first BS comprises using UE scheduling information received, by the second BS, through X-2 signaling.

11. The method of claim 1, wherein calculating, by the BS, the first and other priorities comprises including a parameter for achieving frequency selective gain in calculating the first and the other priorities.

12. The method of claim 1, wherein calculating, by the BS, the first and the other priorities and allocating, by the BS various resource blocks to various UEs is performed in accordance with a proportionally-fair scheduling scheme.

13. The method of claim 1, wherein allocating, by the first BS, the first and the other resource blocks to the first and other UEs for the second TTI in accordance with the first and other priorities comprises allocating a particular resource block, the particular resource block being one of the first or the other resource blocks, to a particular UE, the particular UE being one of the first or other UEs, having a maximum priority for the particular resource block compared with all the first and other priorities for the particular resource block.

14. A base station (BS) comprising:
  a processor; and
  a non-transitory computer readable storage medium storing programming for execution by the processor, the programming including instructions to:
    calculate first priorities of a first user equipment (UE) for various resource blocks for a current transmission time interval (TTI), wherein the calculation of the first priorities includes instructions to:
      determine a first set of recent resource blocks, wherein the first set of recent resource blocks correspond to resource blocks allocated to the first UE in a recent past period of TTIs; and
      include a first set of bonuses in the calculation of the first priorities of the first UE for the first set of recent resource blocks;
    calculate other priorities of other UEs for various resource blocks for the current TTI; and
    allocate various resource blocks to the first and other UEs for the current TTI in accordance with the first and other priorities of the first and other UEs.

15. The BS of claim 14, wherein the instructions to calculate the first and the other priorities comprises further instructions to include a parameter for achieving frequency selective gain in the calculation of the first and the other priorities.

16. The BS of claim 14, wherein the other UEs includes a second UE and the instruction to calculate other priorities includes further instruction to calculate second priorities of the second UE for various resource blocks for the current TTI, wherein the calculation of the second priorities includes instructions to:
  determine a second set of recent resource blocks, wherein the second set of recent resource blocks correspond to resource blocks allocated to the second UE in the recent past period of TTIs; and
  include a second set of bonuses in the calculation of the second priorities of the second UE for the second set of recent resource blocks.

17. The BS of claim 16, wherein the first and the second set of bonuses are a same set of bonuses.

18. The BS of claim 16, wherein the first UE is a cell edge UE (CEU) and the second UE is a cell center UE (CCU) and wherein the first set of bonuses has a greater weight than the second set of bonuses.

19. The BS of claim 14, wherein the first set of recent resource blocks comprises a cell edge bandwidth (CEB) resource block and a cell center bandwidth (CCB) resource block, and wherein the first set of bonuses comprises a first bonus having a first weight for the CEB resource block and a second bonus having a second weight for the CCB resource block, the first weight being different than the second weight.

20. A method for resource allocation comprising:
  calculating, by a base station (BS), priorities of a user equipment (UE) for a set of resource blocks for a current transmission time interval (TTI), wherein the set of resource blocks comprises a first subset of resource blocks and a second subset of resource blocks, and wherein calculating the priorities of the UE comprises:
    including a set of bonuses in calculating first priorities of the UE for the first subset of resource blocks, wherein the first subset of resource blocks correspond to resource blocks allocated to the UE within a past period of TTIs; and
    not including the set of bonuses in calculating second priorities of the UE for the second subset of resources blocks, wherein the second subset of resource blocks correspond to resource blocks not allocated to the UE within a past period of TTIs; and
  allocating, by the BS, the set of resource blocks to the UE and other UEs for the current TTI in accordance with the priorities of the UE.

* * * * *